US010762488B2

(12) United States Patent
Suzuki

(10) Patent No.: US 10,762,488 B2
(45) Date of Patent: Sep. 1, 2020

(54) TRANSACTION DATA PROCESSING APPARATUS

(71) Applicant: TOSHIBA TEC KABUSHIKI KAISHA, Tokyo (JP)

(72) Inventor: Hiromasa Suzuki, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 397 days.

(21) Appl. No.: 15/704,823

(22) Filed: Sep. 14, 2017

(65) Prior Publication Data
US 2018/0075430 A1    Mar. 15, 2018

(30) Foreign Application Priority Data

Sep. 15, 2016   (JP) ................ 2016-180463

(51) Int. Cl.
*G06Q 20/20* (2012.01)
*G06Q 20/04* (2012.01)
*G06Q 20/32* (2012.01)
*G07G 1/00* (2006.01)

(52) U.S. Cl.
CPC ....... *G06Q 20/209* (2013.01); *G06Q 20/0453* (2013.01); *G06Q 20/206* (2013.01); *G06Q 20/325* (2013.01); *G07G 1/0045* (2013.01)

(58) Field of Classification Search
CPC ............. G06Q 20/209; G06Q 20/0453; G06Q 20/325; G06Q 20/206; G07G 1/0045
See application file for complete search history.

(56) References Cited

U.S. PATENT DOCUMENTS

| 6,185,542 B1* | 2/2001 | Moran | G06Q 20/102 235/380 |
| 2003/0126020 A1* | 7/2003 | Smith | G06Q 20/02 705/21 |
| 2005/0165651 A1* | 7/2005 | Mohan | G06Q 20/0453 705/14.64 |
| 2012/0290422 A1* | 11/2012 | Bhinder | G06Q 20/0453 705/21 |

(Continued)

OTHER PUBLICATIONS

Ho et al. "Digital Receipts: Fostering Mobile Payment Adoption". Ambient Intelligence Lecture Notes, Computer Science, 8309, 140-149. 2013. (Year: 2013).*

(Continued)

*Primary Examiner* — Nathan A Mitchell
(74) *Attorney, Agent, or Firm* — Kim & Stewart LLP

(57) ABSTRACT

A transaction data processing apparatus, which communicates with an electronic receipt server, includes a communication interface and a processor configured to perform electronic receipt processing on transaction data having a first format, by (i) extracting, from the transaction data, information items required for generating an electronic receipt, (ii) identifying, for each extracted information item, an information type indicating a category of the extracted information item, (iii) generating exchange data based on the extracted information items and the corresponding information type, the generated exchange data having a second format different from the first format, and (iv) transmitting the generated exchange data to the electronic receipt server through the communication interface.

17 Claims, 4 Drawing Sheets

(56) References Cited

U.S. PATENT DOCUMENTS

| | | | | |
|---|---|---|---|---|
| 2013/0054396 A1* | 2/2013 | Goldfinger | ......... | G06Q 30/0238 705/21 |
| 2013/0198018 A1* | 8/2013 | Baig | ...................... | G06Q 20/20 705/16 |
| 2014/0195361 A1* | 7/2014 | Murphy | ............. | G06Q 20/0453 705/21 |
| 2014/0249951 A1* | 9/2014 | Gotanda | ............ | G06Q 20/0453 705/24 |
| 2014/0249971 A1* | 9/2014 | Susaki | ............... | G06Q 20/0453 705/30 |
| 2014/0307270 A1* | 10/2014 | Suzuki | ............... | G06Q 20/0453 358/1.6 |
| 2014/0307271 A1 | 10/2014 | Suzuki | | |
| 2014/0372198 A1* | 12/2014 | Goldfinger | ............... | G07G 1/14 705/14.33 |
| 2015/0012397 A1* | 1/2015 | Gotanda | .............. | G07G 1/0036 705/30 |
| 2015/0025986 A1* | 1/2015 | Patel | .................. | G06Q 30/0207 705/16 |
| 2015/0073928 A1* | 3/2015 | Arai | ..................... | G06Q 20/209 705/24 |
| 2015/0206111 A1* | 7/2015 | Sugiyama | .......... | G06Q 30/0267 705/14.66 |
| 2015/0356532 A1* | 12/2015 | Gotanda | ................ | G06Q 20/14 705/39 |
| 2015/0356540 A1* | 12/2015 | Sugiyama | ............ | G06Q 20/209 705/21 |
| 2016/0379187 A1* | 12/2016 | Wijngaarden | ...... | G06Q 20/0453 705/40 |

OTHER PUBLICATIONS

Nguyen, Doc Lap, "Digital Receipt System Using Mobile Device Technologies" (2008). University of New Orleans Theses and Dissertations. 705. https://scholarworks.uno.edu/td/705 (Year: 2008).*

* cited by examiner

FIG.3

```
{
"MEMBER ID": 1,
"COMPANY ID": "2",
"STORE ID": "3",
"DATE AND TIME": "2011-06-23 08: 32",
"REGISTER NO.": "4",
"HEADER": [
"###HOLDING WINTER CLOTHING FESTIVAL POPULAR THIS YEAR! ###",
"PLEASE USE!                                                                                   ",
"                                                                                              ",
"JUNE 23th, 2011 (THURSDAY) 08:32    REGISTER 4                                                ",
"                                                                                              ",
"No002 YAMADA TAROU                                                                            "
],
"lines":[
 {"COMMODITY NAME" : "WINTER CLOTHING SWEATER",
"PRICE": 10000,"CATEGORY": "5",
} ,
],
"TOTAL": 10000,
"RECEIPT NO.": 6,
} ,
```

TRANSACTION DATA PROCESSING APPARATUS

CROSS-REFERENCE TO RELATED APPLICATION

This application is based upon and claims the benefit of priority from Japanese Patent Application No. 2016-180463, filed Sep. 15, 2016, the entire contents of which are incorporated herein by reference.

FIELD

Embodiments described herein relate generally to a transaction data processing apparatus.

BACKGROUND

Conventionally, in a transaction data processing apparatus such as a POS (Point-of-Sale) terminal, a receipt (hereinafter, referred to as a paper receipt) is issued by printing required items on a receipt paper after a settlement is completed.

On the other hand, in recent years, an electronic receipt system is being introduced. In the electronic receipt system, a user can see digital receipt data (hereinafter, referred to as electronic receipt data) with an arbitrary information terminal.

Conventionally, the transaction data processing apparatus belonging to the electronic receipt system first generates print data for issuing a paper receipt. Then, the transaction data processing apparatus analyzes the print data to extract information that is necessarily included in electronic receipt data, and determines an information type indicating category of the information on the basis of a position of the information on the paper receipt. Furthermore, the transaction data processing apparatus generates the electronic receipt data as data indicating the extracted information and association of the extracted information with the information type determined on the extracted information.

By constituting processing as described above, it is possible even for the conventional transaction data processing apparatus that issues the paper receipt to adapt to the electronic receipt system by adding a function of generating the electronic receipt data from the print data through the foregoing processing. The function is realized in such a manner that a processor for controlling the transaction data processing apparatus executes an application program. The function is called as, for example, an electronic receipt agent. Further, the foregoing application program is called as, for example, an agent program.

However, in a case in which the electronic receipt data is generated through the processing described above, a relationship between the position at which the information is indicated on the paper receipt and the information type thereof needs to be known beforehand. In other words, processing by the electronic receipt agent may be different according to formats of paper receipts. Thus, it is necessary to prepare different agent programs to correspond to different specifications of transaction data processing. Under such circumstances, it is desired that a common agent program can be applied to the generation of the electronic receipt data regardless of the different specifications of transaction data processing.

DESCRIPTION OF THE DRAWINGS

FIG. 3 is a view illustrating an example of an exchange data;

DETAILED DESCRIPTION

In accordance with an embodiment, a transaction data processing apparatus, which communicates with an electronic receipt server, includes a communication interface and a processor configured to perform electronic receipt processing on transaction data having a first format, by (i) extracting, from the transaction data, information items required for generating an electronic receipt, (ii) identifying, for each extracted information item, an information type indicating a category of the extracted information item, (iii) generating exchange data based on the extracted information items and the corresponding information type, the generated exchange data having a second format different from the first format, and (iv) transmitting the generated exchange data to the electronic receipt server through the communication interface.

Hereinafter, an embodiment is described with reference to the accompanying drawings. In the present embodiment, a POS terminal is exemplified as a transaction data processing apparatus for performing a commodity sales processing. However, the transaction to be processed in the embodiment is not limited to the commodity sales, and may be a transaction for services.

Figure 1:
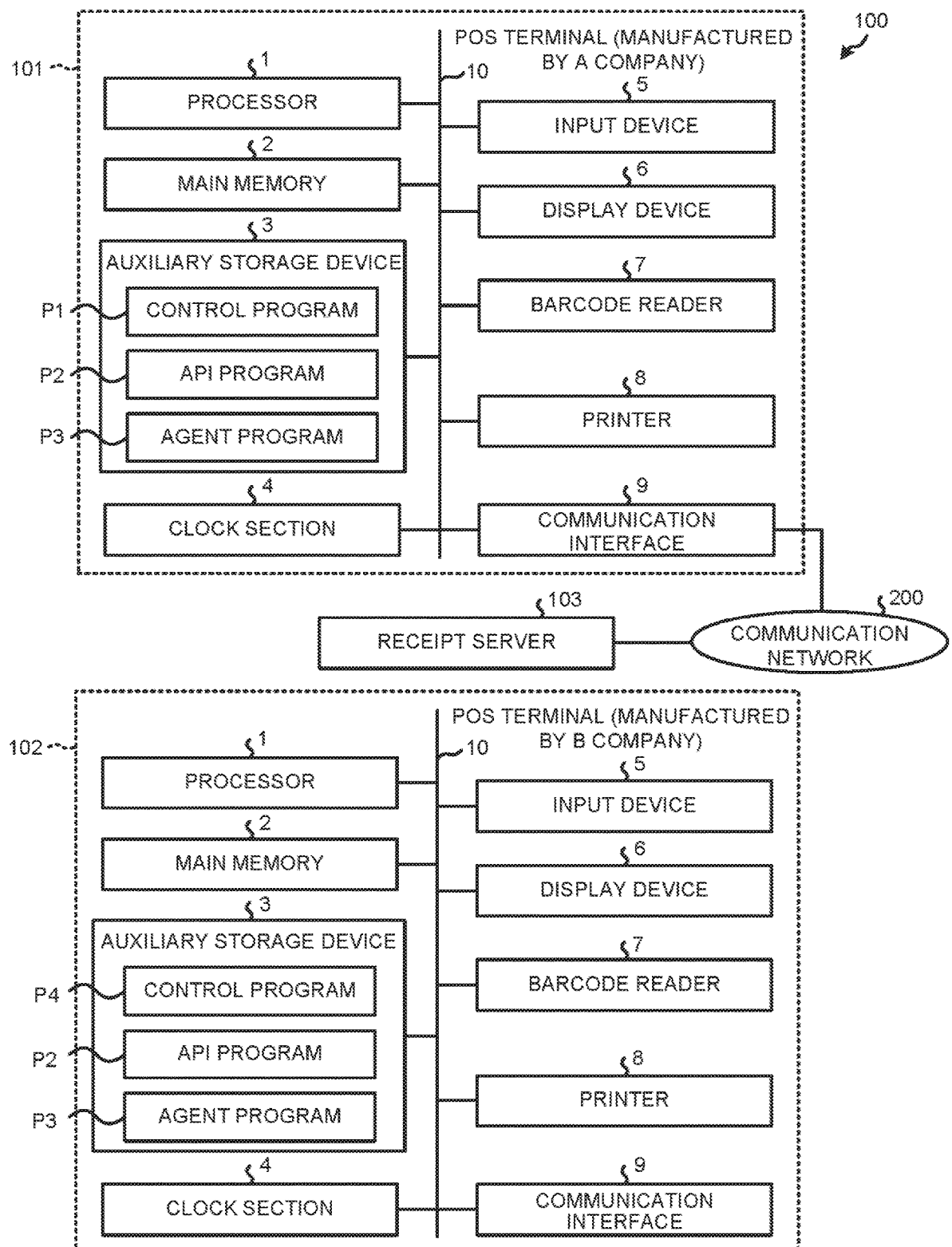
FIG. 1 is a block diagram illustrating an example of configuration of two different POS terminals according to an embodiment.

FIG. 1 is a block diagram illustrating configuration of two different POS terminals according to the present embodiment.

In FIG. 1, an electronic receipt system including POS terminals 101 and 102 and a receipt server 103 are illustrated. The POS terminals 101 and 102 and the receipt server 103 communicate with each other via a communication network 200.

Specifications of transaction data processing of the POS terminals 101 and 102 are different from each other. For example, the POS terminals are manufactured independently from each other by different manufacturers (A company and B company) in the present embodiment. However, in FIG. 1, only the basic configuration of the POS terminals 101 and 102 is shown, and a majority of the basic configuration is common in most cases irrespective of differences of the specifications of the transaction data processing. Therefore, in FIG. 1, elements having the same functions in the POS terminals 101 and 102 have the same reference numerals but are different devices in many cases.

Each of the POS terminals 101 and 102 includes a processor 1, a main memory 2, an auxiliary storage device 3, a clock section 4, an input device 5, a display device 6, a barcode reader 7, a printer 8, a communication interface 9 and a transmission path 10. The processor 1 is connected with the main memory 2, the auxiliary storage device 3, the clock section 4, the input device 5, the display device 6, the barcode reader 7, the printer 8 and the communication interface 9 via the transmission path 10. The transmission path 10 may be an address bus, a data bus, a control signal line and the like.

In each of the POS terminals 101 and 102, the processor 1, the main memory 2 and the auxiliary storage device 3 are connected by the transmission path 10 to function as a computer for controlling the POS terminals 101 and 102.

The processor 1 acts as a main control unit of the computer. The processor 1 controls each section for realizing various functions as the POS terminals 101 and 102 according to an operating system and an application program.

The main memory 2 acts as a main storage unit of the computer. The main memory 2 includes a nonvolatile memory area and a volatile memory area. The main memory 2 stores an operating system and an application program in the nonvolatile memory area. Further, there is a case in which the main memory 2 stores data required for executing a processing by the processor 1 to control each section in the nonvolatile memory area or the volatile memory area. The main memory 2 uses the volatile memory area as a working area where data is appropriately rewritten by the processor 1. In the volatile memory area, an area for storing a purchased commodity list, i.e., a so-called registration processing area is included.

The auxiliary storage device 3 acts as an auxiliary storage unit of the computer. The auxiliary storage device 3 is, for example, an EEPROM (Electric Erasable Programmable Read-Only Memory), an HDD (Hard Disc Drive), or an SSD (Solid State Drive). The auxiliary storage device 3 stores data used by the processor 1 which carries out various processing, and data generated in the processing by the processor 1. The auxiliary storage device also stores application programs and program elements pertaining thereto.

Programs stored in the auxiliary storage device 3 of the POS terminal 101 include, for example, a control program P1, an API program P2 and an agent program P3.

The control program P1 is an application program. The control program P1 describes instructions for a control processing for a variety of operations relating to transaction data processing.

The API program P2 is a program element pertaining to the control program P1. The API program P2 is realized as, for example, a program file in the OLE (OLE control extension) form. The API program P2 is called in the control processing for the transaction data processing based on the control program P1 and executed by the processor 1 to provide an application programming interface (API: Application Programming Interface) for the control processing. Processing described later by the agent program P3 can be used in the control program described above through the API provided by the API program P2.

The agent program P3 is an application program. The agent program P3 describes instructions for generating electronic receipt data as a data including a plurality of data sets supplied from the transaction data processing based on the control program P1 through the API, and sending the generated electronic receipt data to the receipt server 103.

Programs stored in the auxiliary storage device 3 of the POS terminal 102 include a control program P4, the API program P2 and the agent program P3.

In other words, the auxiliary storage device 3 in the POS terminal 102 stores the same API program P2 and agent program P3 as the POS terminal 101. However, the auxiliary storage device 3 in the POS terminal 102 stores the control program P4, instead of the control program P1.

The control program P4 is an application program. The control program P4 describes instructions for a control processing for a variety of operations relating to the transaction data processing.

The control program P1 is created on the premise that the control program P1 is used by the POS terminal 101 manufactured by A company under the management of A company. The control program P4 is created on the premise that the control program P4 is used by the POS terminal 102 manufactured by B company under the management of B company. The API program P2 and the agent program P3 are created by, for example, the manufacturer of the receipt server 103 under the management of a service provider who provides an electronic receipt service.

The POS terminals 101 and 102 are generally provided in a state in which the control programs P1 and P4 are stored in the corresponding auxiliary storage devices 3. In this case, the control programs P1 and P4 may be stored in the corresponding main memories 2. However, there is also a case in which the POS terminals 101 and 102 are provided in a state in which the control programs P1 and P4 are not stored in the main memory 2 or the auxiliary storage device 3. In this case, the control programs P1 and P4 are respectively recorded in corresponding removable recording mediums such as a magnetic disk, a magneto-optical disk, an optical disk, a semiconductor memory and the like and the control programs P1 and P4 respectively stored in the corresponding mediums are transferred to be installed into the POS terminals 101 and 102. Alternatively, the control programs P1 and P4 are transferred via a network. Then, the control programs P1 and P4 may be stored in the corresponding main memories 2 or auxiliary storage devices 3 of the POS terminals 101 and 102 provided separately as above.

The API program P2 and the agent program P3 are not stored in the auxiliary storage device 3 typically at the time that the POS terminals 101 and 102 are provided. The API program P2 and the agent program P3 are downloaded from the receipt server 103 or another server to the POS terminals 101 and 102 via, for example, the communication network 200 to be stored in the auxiliary storage device 3. However, the API program P2 and the agent program P3 may be recorded in a removable recording medium such as a magnetic disk, a magneto-optical disk, an optical disk, a semiconductor memory and the like to be transferred. Alternatively, the POS terminals 101 and 102 may be provided in a state in which the API program P2 and the agent program P3 are stored in the auxiliary storage device 3. In this case, the API program P2 and the agent program P3 may be stored in the main memory 2.

The clock section 4 carries out a clocking operation to output date and time information indicating a current date and time.

The input device 5 receives an operation by an operator and outputs information corresponding to the operation. As the input device 5, for example, a keyboard, a mouse or a touch panel can be used.

The display device 6 displays an image indicating a variety of information to be presented to the operator. As the display device 6, for example, a LCD (liquid crystal display) or a touch panel can be used.

The barcode reader 7 reads a barcode representing a member code for identifying a member for receiving the electronic receipt service. The barcode is generally displayed on a display device of a portable information terminal, i.e., a PDA (Personal Digital Assistant), carried by the member. The barcode reader 7 may also read a barcode representing a commodity code, attached to the commodity, which identifies the commodity; however, a device for reading a barcode representing a commodity code may be provided separately from the barcode reader 7.

The printer 8 prints various character strings and images on a receipt paper. Then, the printer 8 discharges the printed receipt paper to the outside of the POS terminals 101 and 102 to issue a receipt. As the printer 8, for example, a thermal printer or an impact dot printer can be used.

The communication interface 9 carries out data communication via the communication network 200. In other words, the communication interface 9 is an example of a communication device.

Next, operations of the POS terminal 101 having a constitution as described above are described. The processing described below is an example, and as long as it is possible to obtain the same result, the order of processing may be replaced suitably or other processing may be added.

If the POS terminal 101 is started in an operation mode in which the transaction data processing is carried out, the processor 1 starts the control processing in accordance with the control program P1. The transaction data processing section is realized with the execution of the control program P1 by the processor 1.

Figure 2:
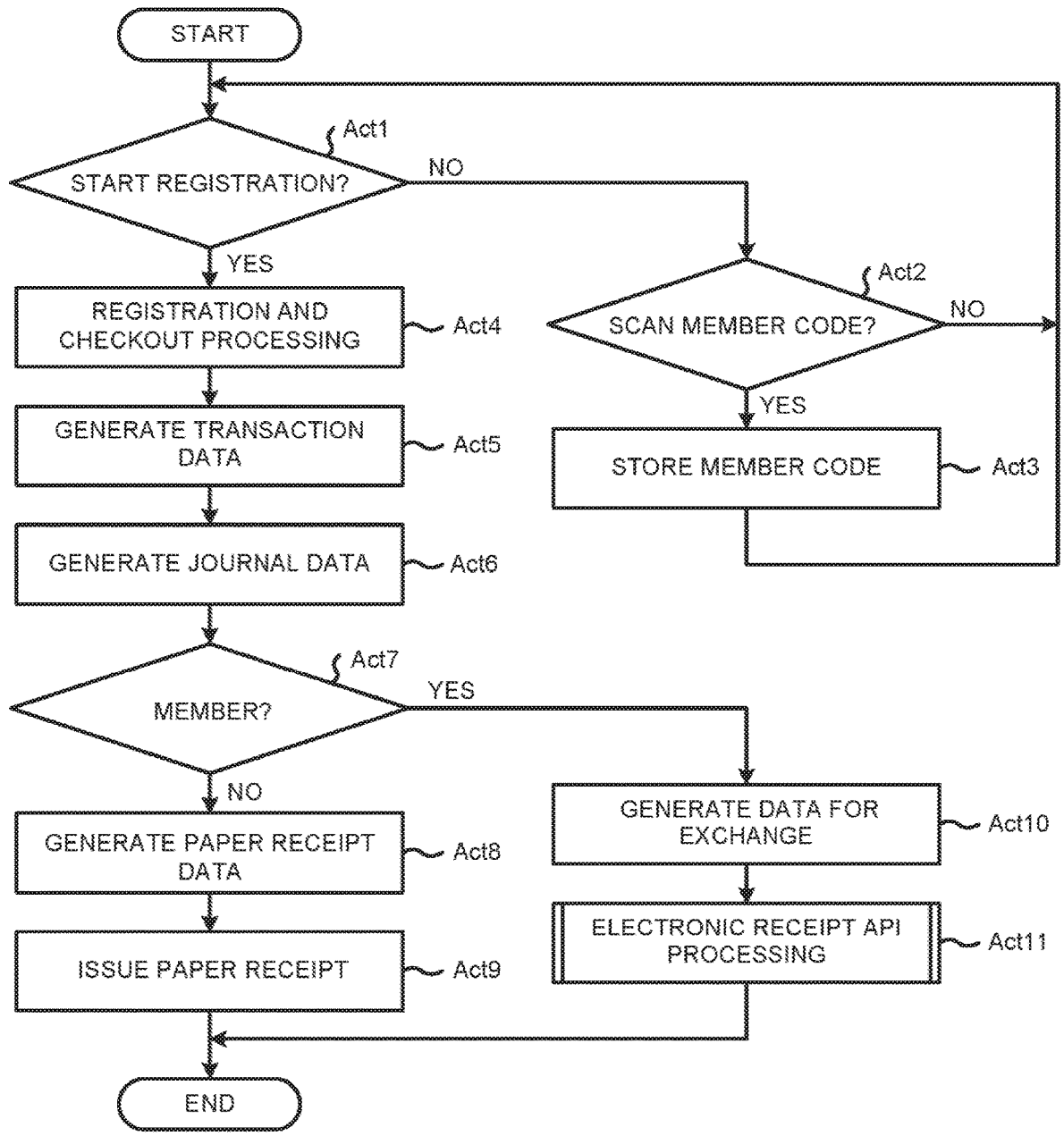
FIG. 2 is a flowchart of a control processing by a processor of the POS terminal in FIG. 1.

FIG. 2 is a flowchart of the control processing performed by the processor 1 of the POS terminal 101

The processor 1 confirms whether or not a registration operation by the operator is started (Act 1). If the corresponding operation is not carried out, then No is taken and the processor 1 proceeds to a processing in Act 2.

The processor 1 confirms whether or not the member code is scanned (Act 2). If the member code is not scanned, then No is taken and the processor 1 returns to the processing in Act 1.

In this way, the processor 1 waits for the start of the registration or the scanning of the member code (Act 1 and Act 2).

Typically, the operator holds the barcode, e.g., member card, representing the member code in front of the barcode reader 7 before carrying out the registration operation relating to a commodity transaction. Then, the barcode reader 7 scans the barcode to extract the member code from the barcode. In response to this operation, Yes is taken in Act 2, and the processor 1 proceeds to a processing in Act 3.

The processor 1 stores the member code extracted by the barcode reader 7 in the main memory 2 or the auxiliary storage device 3 (Act 3). After that, the processor 1 returns to the wait state in Act 1 and Act 2. Furthermore, if advancing to the processing in Act 3 again in response to rescanning of a member code, the processor 1 overwrites the member code stored in the main memory 2 or the auxiliary storage device 3 with the member code extracted newly.

In this way, in the present embodiment, the member code is acquired only before the commodity registration is started. However, the processor 1 may also acquire the member code while the commodity registration is being carried out.

If starting the registration, the operator carries out the registration operation relating to commodities, i.e., objects of the commodity transaction. Then, if the registration operation is carried out during the wait state in Act 1 and Act 2, Yes is taken in Act 1 and the processor 1 proceeds to a processing in Act 4.

The processor 1 carries out a registration processing and a checkout processing (Act 4). In the registration processing, commodities to be purchased by a customer are registered in a purchased commodity list. As the registration processing, the same processing as that carried out by a ready-made POS terminal can be used. The checkout processing includes an account processing and a settlement processing. In the account processing, sales amount of commodities registered in the purchased commodity list in one transaction is calculated. In the settlement processing, payment corresponding to the sales amount is made by a selected settlement method such as cash, credit card and the like. As the checkout processing, the same processing as that carried out by the ready-made POS terminal can be used. Each of the registration processing and the checkout processing is a data processing relating to the transaction of commodities.

The processor 1 generates a transaction data (Act 5). The transaction data includes a data to be collected by a POS server (not shown). The category of specific data included in the transaction data is optional, and is determined by, for example, the designer of the control program describing the control processing shown in FIG. 2 or the manager of the POS terminal 101. Furthermore, the processor 1 may immediately send the transaction data generated herein to the POS server, or may send transaction data accumulated in the auxiliary storage device 3 to the POS server and the like at any later timing.

The processor 1 generates journal data (Act 6). The journal data is utilized for confirming history relating to the commodity transaction processed by the POS terminal 101. The category of specific data included in the journal data is optional, and is determined by, for example, the designer of the control program for the control processing shown in FIG. 2 or the manager of the POS terminal 101. The journal data may be printed on a journal paper to be maintained or may be stored in the form of an electronic data. The journal data in the form of the electronic data is typically stored in the auxiliary storage device 3. However, the journal data may be stored in the POS server or may be recorded in a portable storage medium.

The processor 1 confirms whether or not the customer is a member for receiving the electronic receipt service (Act 7). If the member code is not stored in the main memory 2 or the auxiliary storage device 3 in Act 3, or if the member code stored in the main memory 2 or the auxiliary storage device 3 does not correspond to an active member of the electronic receipt service, then No is taken and the processor 1 proceeds to a processing in Act 8.

The processor 1 generates print data for printing character strings indicating contents of the transaction on the receipt paper on the basis of the list of the purchased commodities and the result of the settlement processing (Act 8).

The processor 1 sends the foregoing print data to the printer 8 and the printer 8 carries out printing according to the print data to issue a paper receipt. After that, the processor 1 ends the control processing shown in FIG. 2 (Act 9).

On the other hand, if the member code is stored in the main memory 2 or the auxiliary storage device 3 in Act 3, then Yes is taken in Act 7 and the processor 1 proceeds to a processing in Act 10.

The processor 1 generates exchange data (Act 10). The exchange data includes a data set in a predetermined format obtained by associating information item which is to be indicated in the electronic receipt in relation to the current commodity transaction with an information type indicating what category of information the information item is. The exchange data is for transferring the data set to the electronic receipt agent processing based on the agent program P3 via the API provided by the API program P2. Thus, the processor 1 sets the data format of the exchange data to a data format defined by the API. The data format may be optionally determined by the service provider of the electronic receipt service, but is assumed to be, for example, a JSON (JAVASCRIPT Object Notation) format ("JavaScript" is a registered trademark). Furthermore, the processor 1 also uses the information type included in the exchange data from information types defined by the API. The information type is, for example, a member ID, a company ID, a store ID, date and time, a register number, a header, a commodity name, a price, a category, and a receipt number. These information types are associated with information items including a member code, a company code, a store code, transaction date and time, a register number, a header, a commodity name, a unit price, a category code and a transaction receipt number. The processor 1 stores the generated exchange data in the auxiliary storage device 3 in a file name defined by the API. Furthermore, various definitions by the API are determined by, for example, the service provider of the electronic receipt service and are disclosed to the manufactures of the POS terminals 101 and 102.

FIG. 3 is a diagram illustrating an example of the exchange data.

In the exchange data shown in FIG. 3, a character string located between two double quotations indicates an information type. The character string indicating the information items associated with the information type is shown following the colon. In this way, the exchange data shown in FIG. 3 represents a data set indicating that, for example, an information item relating to an information type called "member ID" is "1".

The processor 1 calls the API program P2 to instruct sending of a plurality of data sets included in the exchange data and executes the electronic receipt API processing according to the called API program P2 (Act 11). Furthermore, the command for calling the API program P2 is disclosed as the definition of the API.

Figure 4:
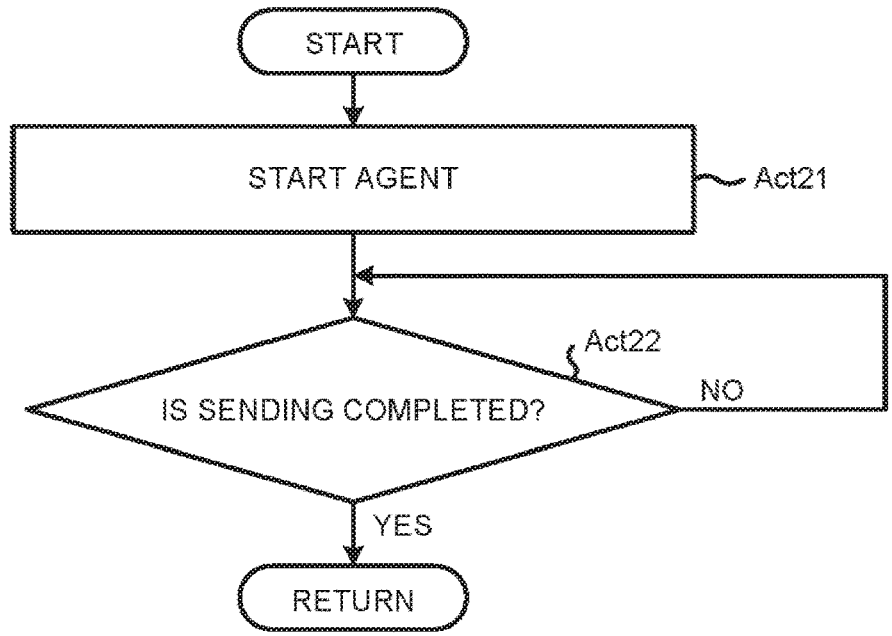
FIG. 4 is a flowchart of an electronic receipt API processing performed by the POS terminal in FIG. 1.

FIG. 4 is a flowchart illustrating processing procedures of the processor 1 in the electronic receipt API processing. The API is realized with the execution of the processing by the processor 1.

The processor 1 starts an electronic receipt agent (Act 21). A command for starting the electronic receipt agent is not disclosed. If the electronic receipt agent is started by the electronic receipt API processing, the processor 1 executes the electronic receipt agent processing based on the agent program P3 in a thread different from the control processing shown in FIG. 2 and the electronic receipt API processing shown in FIG. 4.

Figure 5:
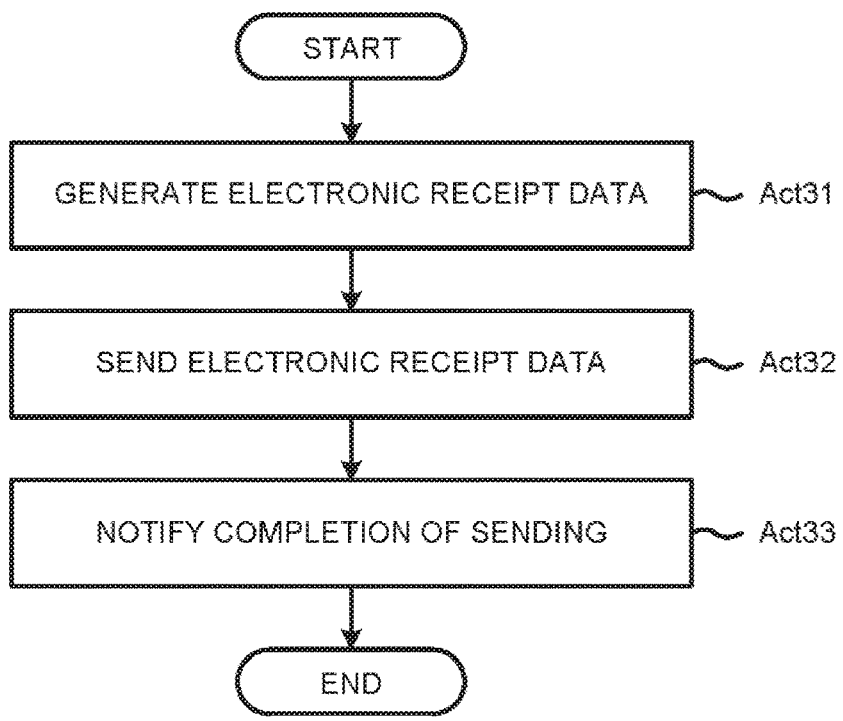
FIG. 5 is a flowchart illustrating an electronic receipt agent processing performed by the POS terminal in FIG. 1.

FIG. 5 is a flowchart illustrating processing procedures of the processor 1 in the electronic receipt agent processing. The electronic receipt agent is realized with the execution of the control processing by the processor 1.

The processor 1 generates electronic receipt data (Act 31). Specifically, the processor 1 reads out the exchange data stored in the auxiliary storage device 3 in the processing in Act 10 in FIG. 2. Then, the processor 1 generates an electronic receipt data in a predetermined format including each of the data sets included in the exchange data and data to be transmitted to the receipt server 103 via the communication network 200.

At this time, the processor 1 may carry out processing such as sorting the order of the data sets in a predetermined order or confirming whether or not necessary data sets are actually included.

The processor 1 instructs the communication interface 9 to send the electronic receipt data generated as described above (Act 32). In response to the instruction, the communication interface 9 sends the corresponding electronic receipt data to the communication network 200. Then, the start of the electronic receipt agent is equivalent to the instruction of such sending.

Then, the electronic receipt data is transmitted to the receipt server 103 via the communication network 200. The receipt server 103 manages an electronic receipt database (not shown) stored in a built-in storage device or an externally mounted storage device. Information items, included in the electronic receipt database, which relates to a plurality of electronic receipt data is associated with the same information types as these defined by the API and is stored in the electronic receipt database. Then, if receiving the electronic receipt data, the receipt server 103 registers the information items associated with the information types in the data sets as information items associated with the information types in the electronic receipt database. The receipt server 103 is accessed from an arbitrary information terminal (not shown), generates data representing an electronic receipt screen on the basis of the electronic receipt database to send the data to the information terminal if the foregoing information terminal requests to provide the electronic receipt screen. The processing in the receipt server 103 at this time may be a well-known processing carried out by, for example, another existing receipt server.

Then, the processor 1 proceeds to a processing in Act 33 if completing the sending of the electronic receipt data in Act 32.

The processor 1 notifies the electronic receipt API processing that the sending is completed (Act 33). The processor 1 thus ends the electronic receipt agent processing shown in FIG. 5.

The processor 1 proceeds to a processing in Act 22 after the electronic receipt agent is started in Act 21 in the electronic receipt API processing shown in FIG. 4.

The processor 1 waits for the completion of the sending of the electronic receipt data (Act 22). Then, Yes is taken in Act 22 if the completion of the sending is notified from the electronic receipt agent processing as described above, and the processor 1 ends the electronic receipt API processing shown in FIG. 4. The processor 1 also ends the control processing shown in FIG. 2.

On the other hand, the processor 1 of the POS terminal 102 carries out a control processing according to the control program P4. Since the control program P4 is different from the control program P1, the control processing according to the control program P4 is not the same as the control processing shown in FIG. 2 according to the control program P1. Generally, the control processing according to the control program P4 is, as a whole, similar to the control processing shown in FIG. 2. However, the contents and the formats of the transaction data and the journal data generated by the control processing are different in the control processing according to control program P1 and the control program P4. Further, in a case in which the paper receipts are respectively issued in the control processing according to the control program P1 and the control program P4, the contents and the formats of the paper receipts are different from one the other.

The API program P2 and the agent program P3 are the same in both POS terminals 101 and 102, and thus the processor 1 of the POS terminal 102 also executes the processing in Act 10 and Act 11 in FIG. 2 in the same procedures as described above. Accordingly, the processor 1 of the POS terminal 102 executes the electronic receipt API processing and the electronic receipt agent processing based on the API program P2 and the agent program P3 in the same procedures as described above. However, all the exchange data need to do is to follow the definition by the API, and it is not necessary that the formats of the exchange data respectively generated by the POS terminals 101 and 102 are completely identical to each other.

As described above, the POS terminals 101 and 102 utilize the common electronic receipt API to deliver the exchange data, which conforms to the definition by the electronic receipt API, to the electronic receipt agent from the control processing for controlling main functions relating to the transaction data processing. Then, the generation of the electronic receipt data from the exchange data and the sending of the electronic receipt data to the receipt server 103 are processed by the common electronic receipt agent. Thus, the agent program is not required to be adapted to the specification of the transaction data processing.

Furthermore, it is necessary that the control programs P1 and P4 generate the exchange data and deliver the generated exchange data to the electronic receipt agent. However, the exchange data may associate optional information items with the information type defined by the electronic receipt API, and the delivery of the exchange data may use the electronic receipt API. Thus, the description in the control programs P1 and P4 relating to the generation and the delivery of the exchange data may be simple, and the time-consuming work taken to create the control programs P1 and P4 is scarcely increased.

Various modifications of the embodiment as described below are applicable.

It is possible to execute operations in the same way as the foregoing embodiment even in a transaction data processing apparatus such as a cash register other than the POS terminal.

Further, it is also possible to realize the transaction data processing apparatus as an apparatus for carrying out at least one of the checkout processing and the settlement processing relating to commodities sales-registered by another registration apparatus. As an example, the transaction data processing apparatus can be realized as a web server. Specifically, the sales registration is carried out by an information terminal capable of communicating with the web server via the communication network, and at least one of the account processing and the settlement processing, the generation of the exchange data, the electronic receipt API processing and the electronic receipt agent processing are carried out by the web server.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A transaction data processing apparatus which communicates with an electronic receipt server, comprising:
   a memory;
   a printer;
   a communication interface; and
   a processor configured to:
   upon receipt of an extension program and an agent program from an electronic receipt server via the communication interface, store the extension program and the agent program in the memory;
   perform registration processing for one or more items to be purchased by a customer in a transaction and generate transaction data having a first format;
   determine whether a code for the customer is stored in the memory;
   upon determining that the code is not stored in the memory, control the printer to print a receipt using the transaction data;
   upon determining that the code is stored in the memory, execute the extension program to
      extract, from the transaction data, information items required for generating an electronic receipt,
      identify, for each extracted information item, an information type indicating a category of the extracted information item, and
      generate exchange data based on the extracted information items and the corresponding information type, the generated exchange data having a second format different from the first format; and
   upon generation of the exchange data, execute the agent program to generate electronic receipt data from the exchange data, and
      transmit the generated electronic receipt data to the electronic receipt server through the communication interface.

2. The transaction data processing apparatus according to claim 1,
   wherein the second format of the exchange data is defined by an operator of the electronic receipt server within the extension program, and the agent program enables communication with the electronic receipt server.

3. The transaction data processing apparatus according to claim 2, wherein the generated exchange data is stored with a file name defined by the extension program.

4. The transaction data processing apparatus according to claim 1, further comprising,
   a barcode scanner configured to scan a barcode representing the code for identifying the customer for receiving an electronic receipt service, wherein the processor is further configured to, upon scanning of the barcode, store the code in the memory.

5. The transaction data processing apparatus according to claim 4, wherein the transaction data is generated based on a barcode of a commodity scanned by the barcode scanner.

6. A method of processing transaction data having a first format for electronic receipt processing, the method comprising:
   upon receipt of an extension program and an agent program from an electronic receipt server, storing the extension program and the agent program in a memory;
   performing registration processing for one or more items to be purchased by a customer in a transaction and generating transaction data having the first format;
   determining whether a code for the customer is stored in the memory;
   upon determining that the code is not stored in the memory, printing a receipt using the transaction data;
   upon determining that the code is stored in the memory, executing the extension program to extract, from the transaction data, information items required for generating an electronic receipt, identify, for each extracted information item, an information type indicating a category of the extracted information item, and
   generate exchange data based on the extracted information items and the corresponding information type, the generated exchange data having a second format different from the first format; and
   upon generation of the exchange data, executing the agent program to generate electronic receipt data from the exchange data, and transmit the generated exchange data to the electronic receipt server.

7. The method according to claim 6, wherein the second format of the exchange data is defined by an operator of the electronic receipt server within the extension program and the agent program enables communication with the electronic receipt server.

8. The method according to claim 7, further comprising:
storing the generated exchange data with a file name defined by the extension program.

9. The method according to claim 6, further comprising:
scanning a barcode representing the code for identifying the customer for receiving an electronic receipt service; and
upon scanning of the barcode, storing the code in the memory.

10. The method according to claim 9, further comprising the step of:
scanning a barcode of a commodity,
wherein the transaction data is generated based on the barcode of the commodity.

11. A non-transitory computer readable medium comprising computer-executable code that causes a computer executing the code to perform a method of processing transaction data having a first format for electronic receipt processing, the method comprising:
upon receipt of an extension program and an agent program from an electronic receipt server, storing the extension program and the agent program in a memory of the computer;
performing registration processing for one or more items to be purchased by a customer in a transaction and generating transaction data having the first format;
determining whether a code for the customer is stored in the memory;
upon determining that the code is not stored in the memory, printing a receipt using the transaction data; and
upon determining that the code is stored in the memory, executing the extension program to extract, from the transaction data, information items required for generating an electronic receipt, identify, for each extracted information item, an information type indicating a category of the extracted information item, and generate exchange data based on the extracted information items and the corresponding information type, the generated exchange data having a second format different from the first format; and
upon generation of the exchange data, executing the agent program to generate electronic receipt data from the exchange data, and transmit the generated exchange data to the electronic receipt server.

12. The non-transitory computer readable medium according to claim 11, wherein the second format of the exchange data is defined by an operator of the electronic receipt server within the extension program and the agent program enables communication with the electronic receipt server.

13. The non-transitory computer readable medium according to claim 12, wherein the generated exchange data is stored with a file name defined by the extension program.

14. The non-transitory computer readable medium according to claim 11, wherein the method further includes:
scanning a barcode representing the code for identifying the consumer for receiving an electronic receipt service; and
upon scanning of the barcode, storing the read code in the memory.

15. The transaction data processing apparatus according to claim 1, wherein
the transaction data processing apparatus is a POS terminal, and
the processor is configured to control the communication interface to transmit the transaction data generated in the first format to a POS server.

16. The method according to claim 6, further comprising:
transmitting the transaction data generated in the first format by a POS terminal to a POS server.

17. The non-transitory computer readable medium according to claim 11, wherein
the method further comprises transmitting the transaction data generated in the first format by a POS terminal to a POS server.

* * * * *